(12) United States Patent
Jun et al.

(10) Patent No.: US 7,591,872 B1
(45) Date of Patent: Sep. 22, 2009

(54) METHOD FOR PRODUCING SILVER NANOPARTICLES AND CONDUCTIVE INK

(75) Inventors: Byung-Ho Jun, Seoul (KR); Kwi-Jong Lee, Seoul (KR); Hye-Jin Cho, Suwon-si (KR); Jae-Woo Joung, Suwon-si (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 293 days.

(21) Appl. No.: 11/498,837

(22) Filed: Aug. 4, 2006

(30) Foreign Application Priority Data

Aug. 8, 2005 (KR) ...................... 10-2005-0072478

(51) Int. Cl.
*B22F 9/24* (2006.01)
(52) U.S. Cl. ........................................ 75/371; 977/896
(58) Field of Classification Search ........................ None
See application file for complete search history.

(56) References Cited

U.S. PATENT DOCUMENTS

| 6,951,666 | B2 * | 10/2005 | Kodas et al. | 427/376.6 |
| 7,160,525 | B1 * | 1/2007 | Peng et al. | 423/1 |
| 2005/0235776 | A1 * | 10/2005 | He et al. | 75/255 |

OTHER PUBLICATIONS

Kwi Jong Lee, et al., "Direct synthesis and inkjeting of silver nanocrystals toward printed electronics", Institute of Physics Publishing, Nanotechnology 17 (2006), pp. 2424-2428.
Kwi Jong Lee, et al., "Environmentally friendly synthesis of organic-soluble silver nanoparticles for printed electronics", IPO Publishing, Nanotechnology 18 (2007), pp. 1-5.
Kwi Jong Lee, et al., "Direct synthesis and bonding orgins of monolayer-protected silver nanocrystals from silver nanocrystals from silver nitrate through in situ ligand exchange", Journal of Colloid and Interface Science 304 (2006), pp. 92-97.

* cited by examiner

*Primary Examiner*—George Wyszomierski

(57) ABSTRACT

A method of producing metal nanoparticles in a high yield rate and uniform shape and size, which is thus suitable for mass production. In addition, metal nanoparticles are provided that have superior dispersion stability when re-dispersed in various organic solvents, which thus suitable for use as a conductive ink having high conductivity. The method of producing nanoparticles includes mixing a metal precursor with a copper compound to a hydrocarbon based solvent, mixing an amine-based compound to the mixed solution of the metal precursor with copper compound and hydrocarbon based solvent, and mixing a compound including one or more atoms having at least one lone pair, selected from a group consisting of nitrogen, oxygen, sulfur and phosphorous to the mixed solution of the amine-based compound, metal precursor with a copper compound and hydrocarbon based solvent.

11 Claims, 3 Drawing Sheets

METHOD FOR PRODUCING SILVER NANOPARTICLES AND CONDUCTIVE INK

CROSS-REFERENCE TO RELATED APPLICATIONS

This application claims the benefit of Korean Patent Application No. 10-2005-0072478 filed on Aug. 8, 2005, with the Korea Intellectual Property Office, the contents of which are incorporated here by reference in their entirety.

BACKGROUND

1. Technical Field

The present invention relates to a method of producing metal nanoparticles, in particular, to a method of producing metal nanoparticles with the solution method.

2. Description of the Related Art

Major ways to produce metal nanoparticles are the vapor-phase method and the solution (colloid) method. Since the vapor-phase method which uses plasma or gas evaporation requires highly expensive equipments, the solution method which is easy for the production is generally used.

A method of producing metal nanoparticles by the solution method up to now is to dissociate a metal compound in a hydrophilic solvent and then apply a reducing agent or a surfactant to produce metal nanoparticles in the form of hydrosol. Another method is the phase transfer method, which produces metal nanoparticles by transferring a compound from a hydrophilic solvent to a hydrophobic solvent to produce metal nanoparticles which are dispersed in the hydrophobic solvent. However, the production of metal nanoparticles by this existing method provides a very low yield rate, as it is limited by the concentration of the metal compound solution. That is, it is possible to form metal nanoparticles of uniform size only when the concentration of the metal compound is less than or equal to 0.05M. Thus, there is a limit also on the yield of metal nanoparticles, and to obtain metal nanoparticles of uniform size in quantities of several grams, 1000 liters or more of functional group are needed. This represents a limitation to efficient mass production. Moreover, the phase transfer method necessarily requires a phase transfer, which is a cause of increased production costs.

Approaches to solve such existing problems and to produce high yield rate of metal nanoparticles with uniform size are in progress.

SUMMARY

The present invention provides a method of producing metal nanoparticles, not requiring high reaction temperature by using a copper compound as a reducing agent and having a high yield rate and uniform size achieved by a simple process. In addition, the present invention provides metal nanoparticles of several or several tens of nanometer size and a high conductive ink including the metal nanoparticles thus obtained.

One aspect of the invention may provide a method of producing nanoparticles comprising, (a) mixing a metal precursor with a copper compound in a hydrocarbon based solvent, (b) mixing an amine-based compound in the mixed solution of (a), and (c) mixing a compound including one or more atoms having at least one lone pair which is selected from a group consisting of nitrogen, oxygen, sulfur and phosphorous in the mixed solution of (b).

Here, the metal precursor may include a compound including one or more metals selected from a group consisting of silver, gold, platinum, palladium and a mixture thereof. In a preferred embodiment, the metal precursor may be one or more compounds selected from a group consisting of nitrate, carbonate, chloride, phosphate, borate, oxide, sulfonate, sulfate stearate, myristate, and acetate, and preferably, one or more compounds selected from a group consisting of $AgNO_3$, $AgBF_4$, $AgPF_6$, $Ag_2O$, $CH_3COOAg$, $AgCF_3SO_3$ and $AgClO_4$. And the metal precursor may be mixed in a mole ratio of 0.05 to 5.

Here, the copper compound may be one or more compounds selected from a group consisting of Copper(II) acetate, Copper (II) acetoacetate, Copper(II) carbonate, Copper(II) cyclohexane butyrate, Copper(II) nitrate, Copper(II) stearate, Copper(II) perchlorate, Copper(II) ethylenediamine, and Copper(II) trifluoroacetylacetonate. In a preferred embodiment, the copper compound may be mixed in a mole ratio of 0.01 to 1 with respect to the metal precursor.

Here, the hydrocarbon-based solvent may be one or more solvents selected from a hydrophobic solvent group consisting of hexane, toluene, xylene, chlorobenzoic acid, 1-hexadecene, 1-tetradecene and 1-octadecene.

Further, the amine-based compound may have a composition of $RNH_2$, where R may be a saturated or unsaturated aliphatic hydrocarbon of $C_3$-$C_{19}$.

Here, the compound of step (c), including one or more atoms having at least one lone pair may be an alkanoic acid or amine-based compound, and a procedure of heating the mixed solution of (c) to 50-200° C. may further be added.

In addition, according to another aspect of the invention may provide metal nanoparticles produced by the method of producing metal nanoparticles described above. Here, metal nanoparticles with a size of 1-20 nm may be obtained.

Still another aspect of the invention may provide conductive ink including the metal nanoparticles.

BRIEF DESCRIPTION OF THE DRAWINGS

These and/or other aspects and advantages of the present invention will become apparent and more readily appreciated from the following description of the embodiments, taken in conjunction with the accompanying drawings of which.

DETAILED DESCRIPTION

Figure 1:
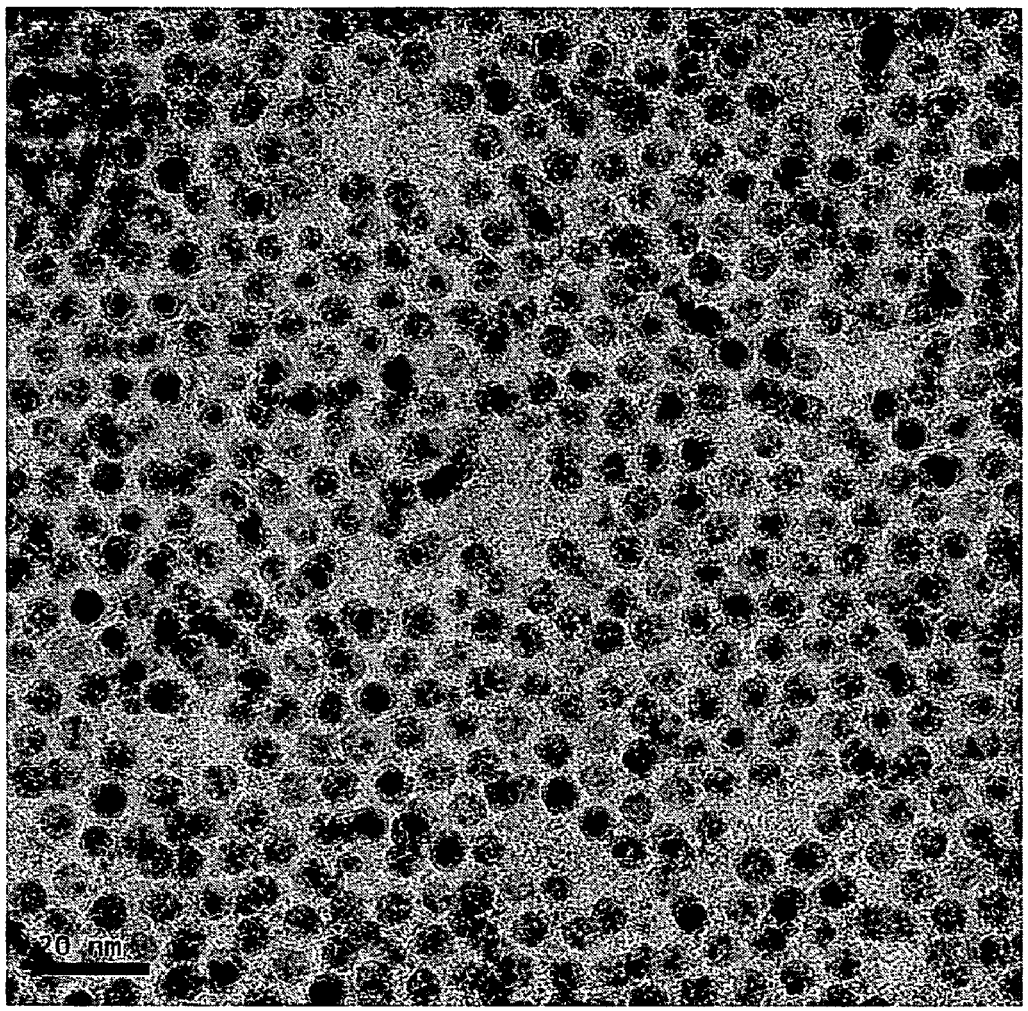
FIG. 1 is a TEM image of the metal nanoparticles produced according to a preferred embodiment of the invention.

Hereinafter, though a method of producing metal nanoparticles according to the present invention will be described in detail, the reactions occur in the procedure of the present invention will be explained first.

The copper compound used in the invention acts as a weak reducing agent, so that it allows an oxidation/reduction reaction between another metal ion and a copper ion. In this reaction, the copper ion functions as a reducing agent that make desired metal nanoparticles possible to form seeds which is responsible for the seed growth, and the seeds thus formed allow metal nanoparticles to grow into uniform size.

As this case, the oxidation/reduction reaction between the copper compound and the metal precursors relates to the standard oxidation/reduction potential of each metal ion. For example, in the case of a silver ion and a copper ion, they have the following oxidation/reduction potential.

$$Ag^+ + e^- \rightarrow Ag \ E° = +0.8V$$

$$Cu^{2+} + e^- \rightarrow Cu^+ \ E° = +0.15 \ V$$

According to a reaction formula as follows, the copper ion is oxidized to become copper 2+ ion, the silver ion is reduced to become Ag particle.

$$Ag^+ + Cu^+ \rightarrow Ag + Cu^{2+} \ E_{total} = +0.65 \ V$$

As a result of the reaction, the total oxidation/reduction potential is a positive value, so that a forward reaction may occur to enable the formation of Ag having zero of oxidation number. According to this, the silver particle grows, so that desired size of silver nanoparticles can be obtained. Gold, platinum, palladium ion also have the same oxidation/reduction potential as follows. Since the value is higher than the standard oxidation/reduction potential of copper, the oxidation/reduction reaction naturally occurs when these metals react with the copper ion.

$$Au^{2+} + 2e^- \rightarrow Au \ E° = +1.42 \ V$$

$$Pt^{2+} + 2e^- \rightarrow Pt \ E° = +1.2V$$

$$Pd^{2+} + 2e^- \rightarrow Pd \ E° = +0.83 \ V$$

Beside these cases, any precursor including a metal that has higher standard oxidation/reduction potential than that of the copper may be used without limitation, preferably, that are dissociated well in a hydrophobic solvent.

Examples of the copper compound that can be used in the present invention may include, but not limited to these, Copper(II) acetate, Copper (II) acetoacetate, Copper(II) carbonate, Copper(II) cyclohexane butyrate, Copper(II) nitrate, Copper(II) stearate, Copper(II) perchlorate, Copper(II) ethylenediamine, and Copper(II) trifluoroacetylacetonate. Besides, any copper compound having $Cu^{2+}$ which has strong reduction power may be used without limitation.

Here, the copper compound is preferably mixed with a metal precursor in a mole ratio of 0.01 to 1. This mole ratio makes metal nanoparticles possible to grow into a uniform size. When the copper compound is mixed less than the mole ratio of 0.01, desired growth of metal nanoparticles does not occur well, so that the copper compound may not play its full role as a reducing agent. On the other hand, when the copper compound is mixed more than a mole ratio of 1, a rapid reaction may occur and thus undesirably cause non-uniform growth. More preferably, the copper compound is mixed in the mole ratio of 0.1 with respect to the metal precursor, which allows uniform and fast formation of metal nanoparticles.

Here, examples of the metal precursor may include inorganic acid salts, such as nitrate, carbonate, chloride, phosphate, borate, oxide, sulfonate, sulfate, etc. and organic acid salts, such as stearate, myristate, and acetate, which include at least one metal selected from a group consisting of silver, gold, platinum, palladium and a mixture thereof. The use of nitrates may be more preferable, as they are economical and widely used. More specific examples of the metal precursor may include silver compound solutions such as of $AgNO_3$, $AgBF_4$, $AgPF_6$, $Ag_2O$, $CH_3COOAg$, $AgCF_3SO_3$ and $AgClO_4$.

Although such metal precursors are generally known to dissociate well in a hydrophilic solvent, the present invention provides a method by which a metal compound is dissociated in a hydrophobic solvent. An amine-based compound was selected for the hydrophobic solvent. Therefore, when a hydrocarbon-based compound is added as a reflux solvent in a later stage, the solubility between the metal ion solution dissociated by an amine based-compound and the hydrocarbon-based compound increases. Thus, the metal nanoparticles may consequently be retrieved with a high yield rate.

These metal precursors may be added in a molarity of 0.05 to 5, this molarity is preferable that the metal nanopartcles be formed uniformly. It is apparent that the existing solution method provides a low yield rate, because metal nanoparticles can be formed at a low concentration of below 0.05 mole ratio. However, the present invention ensures a high yield rate, enabling metal nanoparticles to be formed at a high concentration. The molarity of the metal precursor relates to a yield rate of metal nanoparticles produced, if the concentration can be maintained highly and stably, the higher the concentration, the higher the yield of metal nanoparticles obtained. Here, the concentration of nanoparticles may be below 0.05 mole ratio, but it is not different from the existing solution method and just not preferable in light of the aim of this invention, which is obtaining a high yield rate of metal nanoparticles. On the other hand, it is not preferable that metal nanoparticles be added in more than 5 mole ratio, as the uniform growth of metal nanoparticles may be disturbed. Such a metal precursor and a copper compound are mixed with a hydrocarbon-based solvent, where the hydrocarbon-based solvent is used as a reflux solvent to control reflux temperature. A variety of organic solvents may be selected as a reflux solvent. In the present invention, because a hydrophobic amine-based compound is used as a dissociating solvent, it is preferable that a hydrophobic organic solvent be also used as a reflux solvent. Representative hydrophobic solvent includes hydrocarbon-based compounds. Hence, the type of hydrocarbon-based compound is determined according to a desired condition of reflux.

Preferred examples of hydrocarbon-based compounds include hexane, toluene, xylene, 1-tetradecene, 1-hexadecene, 1-octadecene, and chlorobenzoic acid. Here, toluene, xylene, 1-hexadecene, chlorobenzoic acid, or 1-octadecene, etc. are more preferable for a reflux solvent. That is because it is possible to use a variety of hydrocarbon-based compounds having a low boiling point, which are economical as they does not require a mixed solution to be refluxed in a high temperature and easy to purchase. According to a preferred embodiment, the reflux temperature is in the range from 50 to 110° C. Therefore, hexane, toluene, xylene, dichlorobenzene is more preferably used.

It is preferable that the hydrocarbon-based compound be added to the dissociated metal ion solution so that the concentration of the metal precursor becomes from 0.001 to 10 mole ratio, because preferable reflux condition may be achieved within this range of mole ratio that are suitable for obtaining metal nanoparticles. Preferably, the higher concentration of the metal precursor, the smaller size of the functional group, to be preferable in terms of economy as mass production is made possible. Such concentration of the metal precursor is ultimately related to the yield rate of the metal nanoparticles, and in the existing solution method, the metal nanoparticles are formed only at a low concentration of 0.01 mole ratio or less, which results in a low yield rate. Using the present invention, however, the metal nanoparticles may be formed at a high concentration to ensure a high yield rate.

In addition, the amine-based compound used in the invention may have a composition of $RNH_2$, where R may be a saturated or unsaturated aliphatic hydrocarbon of C3-C19, more preferably C4-C18. It is preferable that this amine-based compound be also in a liquid state to dissociate the metal precursor.

Examples of such amine-based compounds, not limited to these, may include propylamine($C_3H_7NH_2$), butylamine ($C_4H_9NH_2$), octylamine($C_8H_{17}NH_2$), decylamine ($C_{10}H_{21}NH_2$), dodecylamine($C_{12}H_{25}NH_2$), hexadecylamine ($C_{16}H_{33}NH_2$), and oleylamine($C_{18}H_{35}NH_2$), preferably butylamine and propylamine, and more preferably butyl amine, because butylamine and propylamine have a stronger ability of dissociating a metal precursor, moreover, butylamine has a stronger ability of dissociating silver salts than does propylamine. Although octylamine and oleylamine are also in a liquid state, the ability to dissociate silver salts is inferior compared to butylamine and propylamine. Among these amine-based compounds, decylamine($C_{10}H_{21}NH_2$), dodecylamine($C_{12}H_{25}NH_2$), and hexadecylamine ($C_{16}H_{33}NH_2$) are in a solid state, and may be used by heating or dissolving in an organic solvent.

According to a preferred embodiment, the amine-based compound may be mixed with the metal precursor in a mole ratio of 0.05 or more. Considering the reaction conditions and yield rate, etc., it is preferable that the amine-based compounds such as propylamine and butylamine be mixed in a mole ratio of 1 or more. Thus the amine-based compound may be mixed in a mole ratio of 1 to 100 with respect to the metal precursor, where it is preferable that the amine-based compound be mixed as little as possible in terms of economy, within a range where the metal precursor can be dissociated.

In the solution method, capping molecules are required to produce metal nanoparticles, where compounds having one or more atoms selected from oxygen, nitrogen, sulfur and phosphorus may be used as such capping molecules. More specifically, compounds having thiol group(—SH), amine group(—$NH_2$), carboxyl group(—COOH), and —P group may be used, and in a preferred embodiment of the present invention, compounds having alkanoate molecule(—COOR) or amine group are used as the capping molecules.

Here, when the alkanoate molecules are used as the capping molecules, they can be mixed readily with a hydrophobic solvent, and bond with metal nanoparticles by a certain strength to form metal nanoparticles that are stable. Also, when the metal nanoparticles having alkanoate molecules are used as conductive ink, the capping molecules may be removed easily by firing, to form wiring that is superior in electrical conductivity. In addition, compounds having amine group is convenient in producing metal nanoparticles, because they can be readily mixed with hydrophobic solvent and easily separated. In the present invention, alkanoic acid is used as the compound having alkanoate molecules. Alkanoic acid has a composition of RCOOH, where R is a saturated or unsaturated aliphatic hydrocarbon of $C_3$-$C_{20}$. That is, R may be an alkyl group, an alkenyl group or alkylene group of $C_3$-$C_{20}$. More specific examples of these alkanoic acids may include lauric acid($C_{11}H_{22}$COOH), oleic acid ($C_{17}H_{33}$COOH), decanoic acid($C_9H_{19}$COOH), palmitic acid ($C_{15}H_{31}$COOH), etc. Among these, lauric acid and oleic acid are used in terms of yield rate and conductivity according to a preferred embodiment of the present invention.

Moreover, any compound having amine group of $C_4$-$C_{40}$ can be used as capping molecules. This compound is not limited to primary amines, but secondary and third amines may be used too, and an aliphatic hydrocarbon or an aromatic hydrocarbon may bind to it. Specific examples of such amine compounds may include previously described amine-based compounds that are used for a dissociating solution. Alkanoic acid or an amine-based compound may be mixed more than 0.05 mole ratio with respect to the metal precursor for capping metal nanoparticles.

In the invention, since the available boiling point is 50° C. or more, additional reducing agent is not required to raise the reflux temperature and yield rate, and the copper compound conduct such a role to ensure a high yield rate. To facilitate the oxidation/reduction reaction, the method of the invention may further include a step that provides reflux conditions. The reflux temperature is decided according to the boiling point of a selected hydrocarbon compound. Such reflux is performed at a temperature ranges from 50 to 200° C., for 10 minutes to 10 hours. Preferably, metal nanoparticles may be obtained at 60 to 110° C. for 30 minutes to 4 hours.

The metal nanoparticles thus produced may be retrieved by depositing in a polar solvent without size grading procedure and then by centrifuging. Since the metal nanoparticles thus formed have uniform size so that a size grading procedure is not required. Here, the available polar solvent may include acetone, ethanol, methanol or a mixture thereof.

The metal nanoparticles thus retrieved have a uniform size of 1 to 20 nm, and preferably, uniformly sized metal nanoparticles of 4 to 7 nm were obtained. FIG. 1 shows a TEM image of metal nanoparticles produced according to a preferred embodiment of the invention. Referring to FIG. 1, the result of analysis of silver nanoparticles retrieved by the production method of the invention shows that silver nanoparticles having uniform size of 4 nm has been formed. According to this image, it is seen that also the stability of retrieved silver nanoparticles is quite good.

The metal nanoparticles are produced in a high-viscosity hydrophobic hydrocarbon-based compound, so that the yield rate of metal nanoparticles may be increased to 60-90%. Compared to the fact that the existing method reaches only 10% yield rate, more than 6 times of yield rate may be expected in the present invention, which is also suitable for mass production.

The metal nanoparticles thus obtained may be used for desired utility such as an antibiotic, a deodorant, a disinfectant, conductive adhesive, conductive ink, or an electromagnetic shield for a display device. When the metal nanoparticles are used as conductive ink, the metal nanoparticles may be dispersed in a hydrophobic hydrocarbon-based solvent. This is because the solubility of the metal nanoparticles is high in hydrocarbon-based solvents, because they were produced in a hydrophobic solvent.

Specific examples of the method of producing metal nanoparticles and conductive ink will be described here in detail.

EXAMPLE 1

Figure 2:
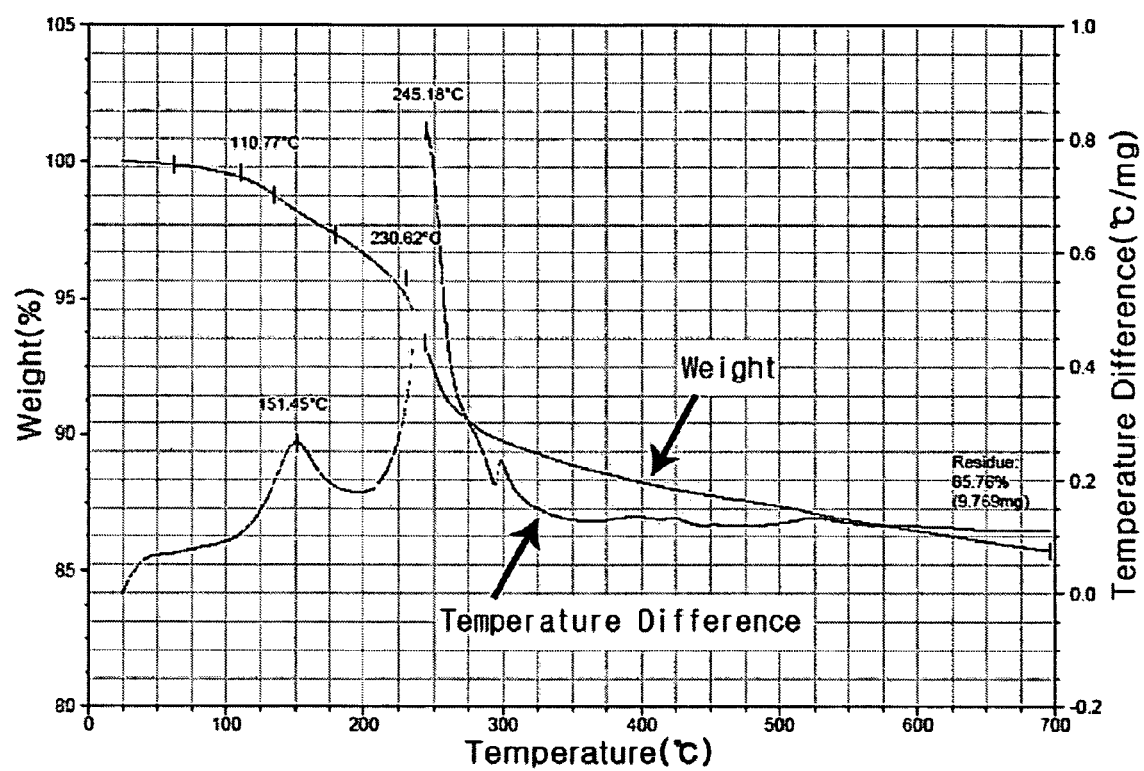
FIG. 2 is a graph representing the result of TGA analysis for the metal nanoparticles produced according to a preferred embodiment of the invention.

170 g of $AgNO_3$ and 20 g of copper (II) acetoacetate (Cu (acac)$_2$) compound were mixed to 300 g of toluene solvent and then 100 g of butylamine was further added and stirred. 50 g of palmitic acid was added to this mixed solution. The reaction mixture was heated to 110° C. and then sustained by stirring for 2 hours and cooled to room temperature(28° C.). Ag nanoparticles thus formed were added to methanol and centrifuged to precipitate and the precipitates, Ag nanoparticles, were separated out. As shown in FIG. 1, 90 g of metal nanoparticles that have uniform size distribution of 4 nm were obtained. As illustrated in FIG. 2, the result of TGA analysis shows that Ag content by percentage is 85 wt %. When Ag nanoparticles thus retrieved were re-dispersed in an organic solvent, high dispersion stability was observed, re-dispersion yield rate was also high.

EXAMPLE 2

Figure 3:
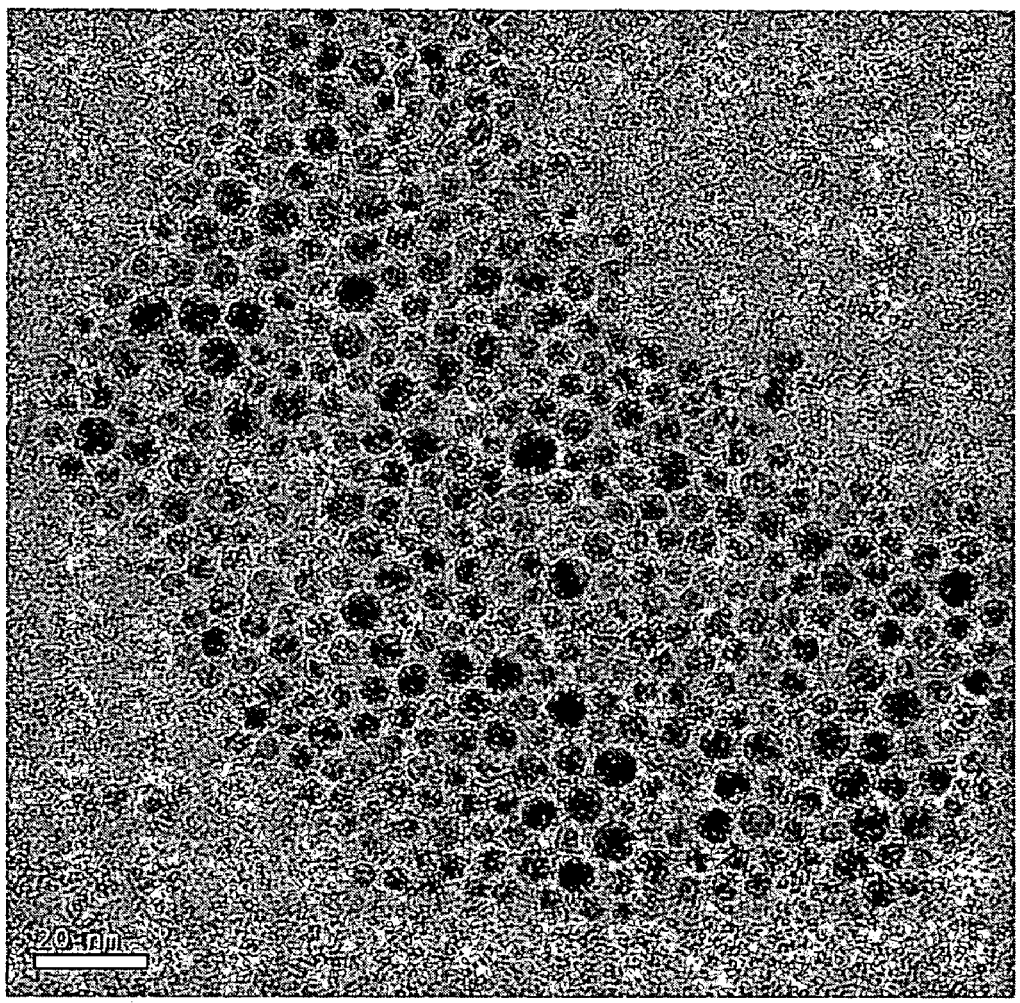
FIG. 3 is a TEM image of the metal nanoparticles produced according to another preferred embodiment of the invention.

170 g of $AgNO_3$ and 20 g of copper (II) acetoacetate (Cu (acac)$_2$) compound were mixed to 300 g of toluene solvent and then 100 g of butylamine was further added and stirred. 50 g of oleylamine was added to this mixed solution, and these mixed compounds were heated to 110° C. and then sustained by stirring for 1 hour and cooled to room temperature(28° C.). Ag nanoparticles thus formed were added to methanol and centrifuged to precipitate and the precipitates, Ag nanoparticles, were separated out. As shown in FIG. 3, 90 g of metal nanoparticles that have uniform size distribution of 5 nm were obtained.

Comparison Example 170 g of AgNO$_3$ was mixed to 300 g of toluene solvent and then 100 g of butylamine was further added. 50 g of palmitic acid was added to this mixed solution, and these mixed compounds were heated to 110° C. and then sustained by stirring for 2 hours and cooled to room temperature(28° C.). Ag nanoparticles thus formed were added to methanol and centrifuged to precipitate and the precipitates, Ag nanoparticles, were separated out. 10 g of metal nanoparticles were obtained. Ag nanoparticles having ununiform distribution and size of 4 to 12 nm were obtained.

Production of Conductive Ink 10 g of silver nanoparticles having 4 to 5 nm in size, produced by Examples 1 and 2, was added to an aqueous solution of diethyleneglycol butylether acetate and ethanol, and then dispersed with an ultra-sonicator to produce conductive ink of 20 cps. The conductive ink thus produced was printed on a circuit board to form conductive wiring by inkjet techniques.

Although the embodiment of the present invention mainly provides the production of silver nanoparticles, beside a silver compound, metal precursor containing a metal chosen from gold, platinum, palladium or a mixture thereof is also applicable. That is, metal nanoparticles may be produced by the same method of examples described above.

It is also apparent that the present invention is not limited to the examples set forth above and more changes may be made by those skilled in the art without departing from the principles and spirit of the present invention.

As described above, the method of producing metal nanoparticles according to the present invention provides a high yield rate of nanoparticles having uniform shape and size, which is suitable for mass production. In addition, the metal nanoparticles produced according to the present invention have superior dispersion stability when re-dispersed in various organic solvents, so that a variety of uses are available, which includes a conductive ink having high conductivity.

What is claimed is:

1. A method of producing metal nanoparticles, said method comprising:
   mixing a metal precursor with a copper compound as a reducing agent to a hydrocarbon-based solvent, said metal precursor containing a metal having a higher standard oxidation/reduction potential than that of copper;
   mixing an amine-based compound to the mixed solution of the metal precursor with a copper compound and hydrocarbon-based solvent; and
   mixing a compound including one or more atoms having at least one lone pair, selected from a group consisting of nitrogen, oxygen, sulfur and phosphorous, to the mixed solution of the amine-based compound, metal precursor with copper compound and hydrocarbon-based solvent.

2. The method of claim 1, wherein the metal precursor includes a compound including one or more metals selected from a group consisting of silver, gold, platinum, palladium and a mixture thereof.

3. The method of claim 2, wherein the metal precursor is one or more compounds selected from a group consisting of nitrate, carbonate, chloride, phosphate, borate, oxide, sulfonate, sulfate stearate, myristate, and acetate.

4. The method of claim 3, wherein the metal precursor is a compound including one or more compounds selected from a group consisting of AgNO3, AgBF4, AgPF6, Ag2O, CH3COOAg, AgCF3SO3 and AgClO4.

5. The method of claim 1, wherein the metal precursor is mixed in a mole concentration of 0.05 to 5.

6. The method of claim 1, wherein the copper compound is one or more compounds selected from a group consisting of Copper(II) acetate, Copper (II) acetoacetate, Copper(II) carbonate, Copper(II) cyclohexane butyrate, Copper(II) nitrate, Copper(II) stearate, Copper(II) perchlorate, Copper(II) ethylenediamine, Copper(II) trifluoroacetylacetonate.

7. The method of claim 6, wherein the copper compound is mixed in a mole ratio of 0.01 to 1 with respect to the metal precursor.

8. The method of claim 1, wherein the hydrocarbon-based solvent is one or more solvents selected from a hydrophobic solvent groups of hexane, toluene, xylene, chlorobenzoic acid, 1-hexadecene, 1-tetradecene and 1-octadecene.

9. The method of claim 1, wherein the amine-based compound has a composition of RNH2, where R is a saturated or unsaturated aliphatic hydrocarbon of C3-C19.

10. The method of claim 1, wherein the compound including one or more atoms having at least one lone pair, is alkanoic acid or an amine-based compound.

11. The method of claim 1, further comprising heating the mixed solution of the compound, the mixed solution of the amine-based compound, metal precursor with copper compound and hydrocarbon-based solvent to 50-200° C.

* * * * *

UNITED STATES PATENT AND TRADEMARK OFFICE
CERTIFICATE OF CORRECTION

| | | |
|---|---|---|
| PATENT NO. | : 7,591,872 B1 | Page 1 of 1 |
| APPLICATION NO. | : 11/498837 | |
| DATED | : September 22, 2009 | |
| INVENTOR(S) | : Byung-Ho Jun et al. | |

It is certified that error appears in the above-identified patent and that said Letters Patent is hereby corrected as shown below:

Title Page, Column 2 Item [56], Line 7, change "orgins" to --origins--.

Title Page, Column 2 Item [56], Lines 8-9, after "nanocrystals from" delete "silver nanocrystals from".

Column 8, Lines 21-22, Claim 4 change "AgNO3, AgBF4, AgPF6, Ag2O, CH3COOAg, AgCF3SO3 and AgClO4." to --$AgNO_3$, $AgBF_4$, $AgPF_6$, $Ag_2O$, $CH_3COOAg$, $AgCF_3SO_3$ and $AgClO_4$.--.

Column 8, Line 40, Claim 8 change "RNH2," to --$RNH_2$,--.

Column 8, Line 42, Claim 9 change "C3-C19." to --$C_3$-$C_{19}$--.

Signed and Sealed this

Thirteenth Day of September, 2011

David J. Kappos
*Director of the United States Patent and Trademark Office*